W. C. MATTESON.
BAND TIGHTENER FOR FLEXIBLE BAND WHEELS.
APPLICATION FILED AUG. 30, 1911.
1,039,421.
Patented Sept. 24, 1912.
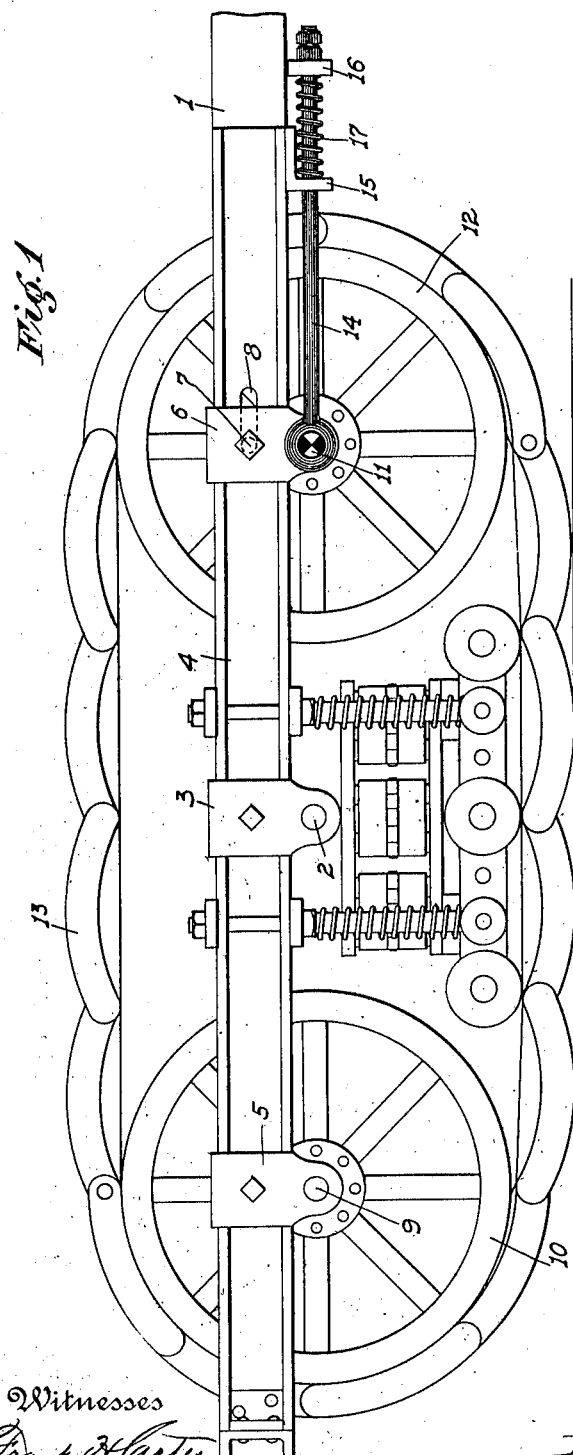
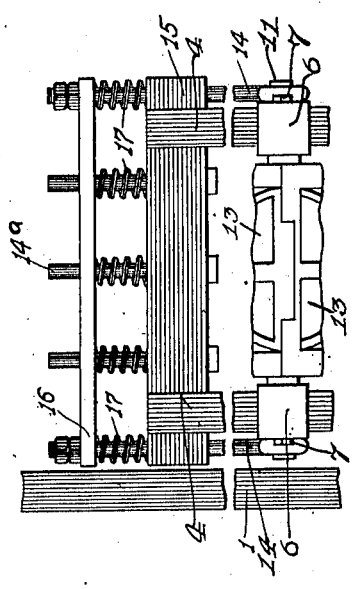
Witnesses
Inventor
W. C. Matteson
By
Attorney

UNITED STATES PATENT OFFICE.

WALTER C. MATTESON, OF SAN JOSE, CALIFORNIA.

BAND-TIGHTENER FOR FLEXIBLE BAND-WHEELS.

1,039,421.  Specification of Letters Patent.  Patented Sept. 24, 1912.

Original application filed March 23, 1910, Serial No. 551,093. Divided and this application filed August 30, 1911. Serial No. 646,931.

*To all whom it may concern:*

Be it known that I, WALTER C. MATTESON, a citizen of the United States, residing at San Jose, in the county of Santa Clara, State of California, have invented certain new and useful Improvements in Band-Tighteners for Flexible Band-Wheels; and I do declare the following to be a full, clear, and exact description of the same, such as will enable others skilled in the art to which it appertains to make and use the same, reference being had to the accompanying drawings, and to the characters of reference marked thereon, which form a part of this application.

This invention relates to improvements in wheels used for all purposes, the object of the invention being to produce a simple and inexpensive flexible wheel truck, the same being substantially elongated in shape and having a flexible endless band to present a long, flat tread to the ground surface, such truck having a center hub and spaced outer operating wheels over which the band is operated, one of which wheels is driven by the power from the vehicle to which the truck is attached, the entire band wheel truck being flexible to conform to all unevenness of surface and being also flexibly secured to the vehicle to which it is attached to permit said vehicle to at all times remain in substantially an even plane regardless of what rough and uneven surfaces the band-wheel truck passes over.

A further object of the invention and the main structure hereafter described and claimed is a resilient automatic tightener for such flexible band which will at all times maintain the same in a normal taut position and prevent it from sagging or becoming loose.

The main features of the band wheel truck itself are set forth and claimed in application for patent made by me March 23rd, 1910, Serial No. 551,093, in which the subject matter of this application was originally claimed but which is hereby divided from said application and made a part of this case, and reference is made to said original application for greater certainty.

The objects above set forth are accomplished by means of such structure and relative arrangement of parts as will fully appear by a perusal of the following specification and claims.

In the drawings similar characters of reference indicate corresponding parts in the several views.

Figure 1 is a side elevation of the flexible band truck complete, showing my improved tightener thereon. Fig. 2 is a top plan view of one end of the flexible band wheel truck showing my improved tightening means.

Referring now more particularly to the characters of reference on the drawings, 1 designates the main frame of the vehicle to which my improved band wheel truck is attached, which vehicle may be power driven as a traction engine or any other vehicle such as a hauling truck, wagon, or similar vehicles. On said truck 1 is suitably secured a shaft or axle 2 mounted on which is a journal box or hub 3 of my improved flexible band truck, which hub carries an elongated or flexible oblong frame 4 carrying rigid journal boxes 5 at its rear end and journal boxes 6 at its forward end, such boxes 6 having pins 7 movable in elongated slots 8 in said frame 4. In the boxes 5 is journaled a shaft 9 on which are secured spaced wheels 10 of any desired structure. The shaft 9 is rotated by power from the vehicle by means of any suitable gear or sprocket structure.

In the boxes 6 is journaled a shaft 11 carrying two spaced wheels 12 alined with the wheels 10 and being of similar structure to said wheels 10. Mounted on the wheels 10 and 12 is a flexible band 13 of any suitable desired structure but more particularly of a structure such as is shown in said application, Serial No. 551,093 heretofore referred to. This band wheel has also supporting means and other structure to operate therewith shown in the drawings herewith presented but not described, which structure is also shown, described and claimed in said application Serial No. 551,093.

The flexibility of the band 13 coupled with the sliding boxes 6 as described permits the band to conform to any unevenness or roughness of surface, such band 13 being held automatically in its normal taut position and being prevented from sagging or becoming loose by means of the following structure, to-wit: On each end of the shaft 11 is a rod 14, such rods projecting through a flange 15 on the frame 4 and then a cross bar 16 is bolted on the outer ends of said rods 14 at a spaced distance from the flange 15. I then provide a plurality of rods or pins 14ª bolted in the flange 15 and having their free ends projecting a distance through the bar 16. Then around the pins 14 I provide springs 17 which are interposed between the flange 15 and the bar 16. Thus since the bar 16 is bolted to the bars 14 and the springs 17 press against the said bar 16, this will keep the tension of the same pulling on the rods 14 thus keeping the shaft 11 pulled to its foremost position which will keep the flexible band 13 normally taut.

From the foregoing description it will readily appear that I have produced such a device as substantially fulfills the objects of the invention as set forth herein.

While this specification sets forth in detail the present and preferred construction of the device, still in practice such deviations from such detail may be resorted to as do not form a departure from the spirit of the invention.

Having thus described my invention what I claim as new and useful and desire to secure by Letters Patent is:—

1. A device as described comprising a frame, a wheel fixedly journaled in one end of said frame, said frame being provided with elongated longitudinal slots in its other end, two journal boxes, pins mounted in said journal boxes and being slidable through said slots, a shaft mounted in said journal boxes, rods connected with said shaft, a flange on said frame, said rods projecting through said flange, a stop member secured on said rods, a plurality of independent pins secured to said flange and projecting through said stop member, springs interposed between such stop member and said flange and around said rods and said independent pins, a wheel mounted on said shaft, and a flexible band disposed over said two named wheels, as described.

2. A device as described comprising a frame, a wheel fixedly journaled in one end of said frame, said frame being provided with elongated longitudinal slots in its other end, a journal box disposed slidably over each of the sides of said frame and having pins movable in said slots, a shaft journaled in the lower ends of said journal boxes, a flange on the end of said frame, rods mounted on each end of said shaft and projecting through said flange, a bar bolted on said rods at a spaced distance from said flange, a plurality of pins bolted into said flange and having their free ends projecting through said bar, springs disposed around said rods and said pins and interposed between said flange and said bar, a wheel mounted on said shaft, and a flexible band disposed over said two named wheels, as described.

In testimony whereof I affix my signature in presence of two witnesses.

WALTER C. MATTESON.

Witnesses:
EDWARD G. MEINECKE,
C. C. MCKAY.